United States Patent [19]
Hicks

[11] Patent Number: 5,275,472
[45] Date of Patent: Jan. 4, 1994

[54] SHOPPING CART WHEEL WITH ADJUSTABLE FRICTION

[76] Inventor: Jimmy L. Hicks, 15654 Olive Branch, La Mirada, Calif. 90638

[21] Appl. No.: 897,015

[22] Filed: Jun. 11, 1992

[51] Int. Cl.$^5$ .............................................. F16D 63/00
[52] U.S. Cl. .................................. 301/105.1; 188/83; 188/1.12; 16/35 R
[58] Field of Search ................. 301/105.1, 110.6, 111, 301/124.1, 126, 131, 6.1, 6.8; 188/1.12, 83; 16/35R

[56] References Cited

U.S. PATENT DOCUMENTS

| 4,633,544 | 1/1987 | Hicks | 188/83 X |
| 5,002,163 | 3/1991 | Kidd | 188/1.12 X |

Primary Examiner—Russell D. Stormer
Attorney, Agent, or Firm—Edgar W. Averill, Jr.

[57] ABSTRACT

An improved shopping cart wheel having one or two friction disks which rub against the hub to cause sufficient drag to prevent shopping carts from freewheeling and causing damage or injury. In a preferred design, the amount of friction is adjustable by tightening a nut along the axle of the wheel.

12 Claims, 2 Drawing Sheets

SHOPPING CART WHEEL WITH ADJUSTABLE FRICTION

BACKGROUND OF THE INVENTION

The field of the invention is casters, and the invention relates more particularly to shopping cart wheels. Such wheels are held in a yoke.

The wheel has a hub about which a thread is formed, and the hub contains a pair of bearing-supporting recesses. An axle is held by the hub and supports the wheel. Unfortunately, such wheels are freely rotatable, typically including ballbearing containing bearings. Because of this, when combined with a parking area slope or wind, the shopping cart can become free sailing, and such carts cause millions of dollars in damage claims each year. Even a minor amount of damage can require store personnel spending many hours of time each year trying to soothe customer tempers and fill out insurance claim reports and forms. The typical property damage claim is $200, and personal injury claims can, of course, run many times more than this. With the introduction of plastic baskets, even more surface area is presented to the wind, and it is expected that damage claims will rise.

While various shopping cart brakes have been devised to eliminate this problem, customers are not prone to using such brakes, and a foolproof system to prevent free sailing carts would really reduce property damage and personal injury.

The amount of friction caused by the wheels should be no more than that needed to prevent the cart from freewheeling for the conditions of the particular outlet. Thus, it would be beneficial to make the amount of friction adjustable. In this way, the cart does not tend to freewheel, and no brake needs to be set by the shopper.

SUMMARY OF THE INVENTION

It is an object of the present invention to provide a shopping cart wheel which has a predictable amount of friction which is sufficient to prevent the shopping cart from freewheeling.

The present invention is for an improved shopping cart wheel of the type having a hub with a pair of inner bearing races, a plurality of ballbearings, a pair of outer bearing races and an axle supported on a yoke. The improvement of the present invention comprises a hub, friction surface on at least one face of the hub and at least one friction disk supported so that it does not rotate with respect to the yoke in normal use. The friction disk has a friction surface which contacts the hub friction surface as the wheel is turned to create a consistent and predictable amount of drag. Preferably, there are a pair of friction disks, one on each side of the hub, and also, preferably, the amount of friction is adjustable. A preferred method for adjusting the amount of friction is to provide a lock nut at one end of the axle. The tightening of the lock nut increases the amount of pressure between the friction disk and the hub friction surface thereby increasing the amount of drag.

DESCRIPTION OF THE PREFERRED EMBODIMENTS

Figure 1:
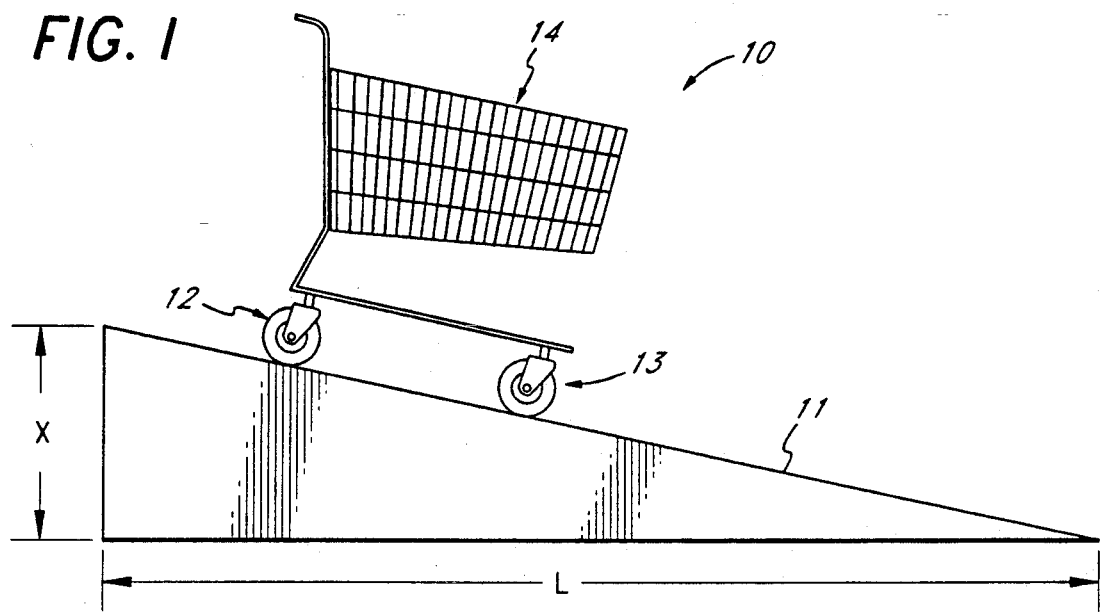
FIG. 1 is a diagrammatical side view of a shopping cart on a slope.

A shopping cart 10 is shown on a sloped surface 11 having a slope of X/L. Shopping cart 10 has four wheels, two of which are indicated by reference characters 12 and 13.

As is well known by most shoppers, shopping carts tend to be freewheeling and will readily move down a slope such as that depicted in FIG. 1. The majority of problems with freewheeling carts occurs when a basket 14 is empty since most shoppers will retain control of the cart while it is full. Thus, the goal is to prevent the freewheeling of an empty cart on a surface present in the market's parking lot or under the typical wind conditions present thereon.

Figure 2:
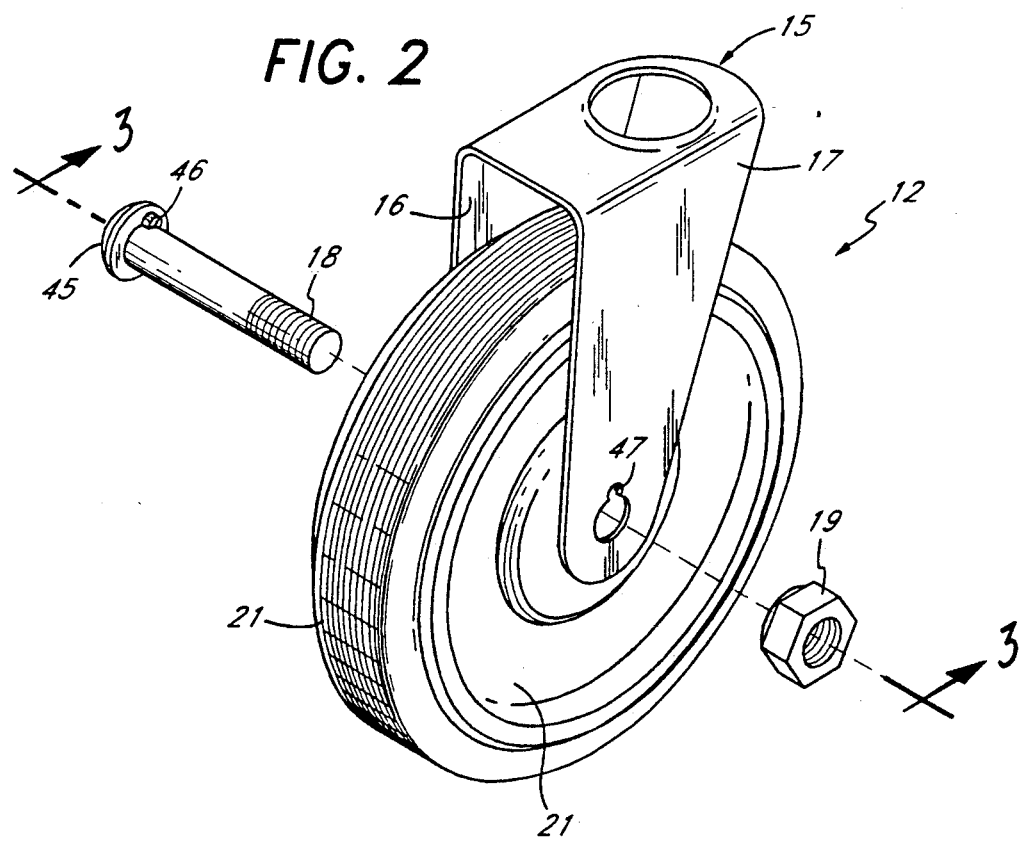
FIG. 2 is a perspective view of a wheel and yoke assembly of the friction wheel of the present invention.
Figure 3:
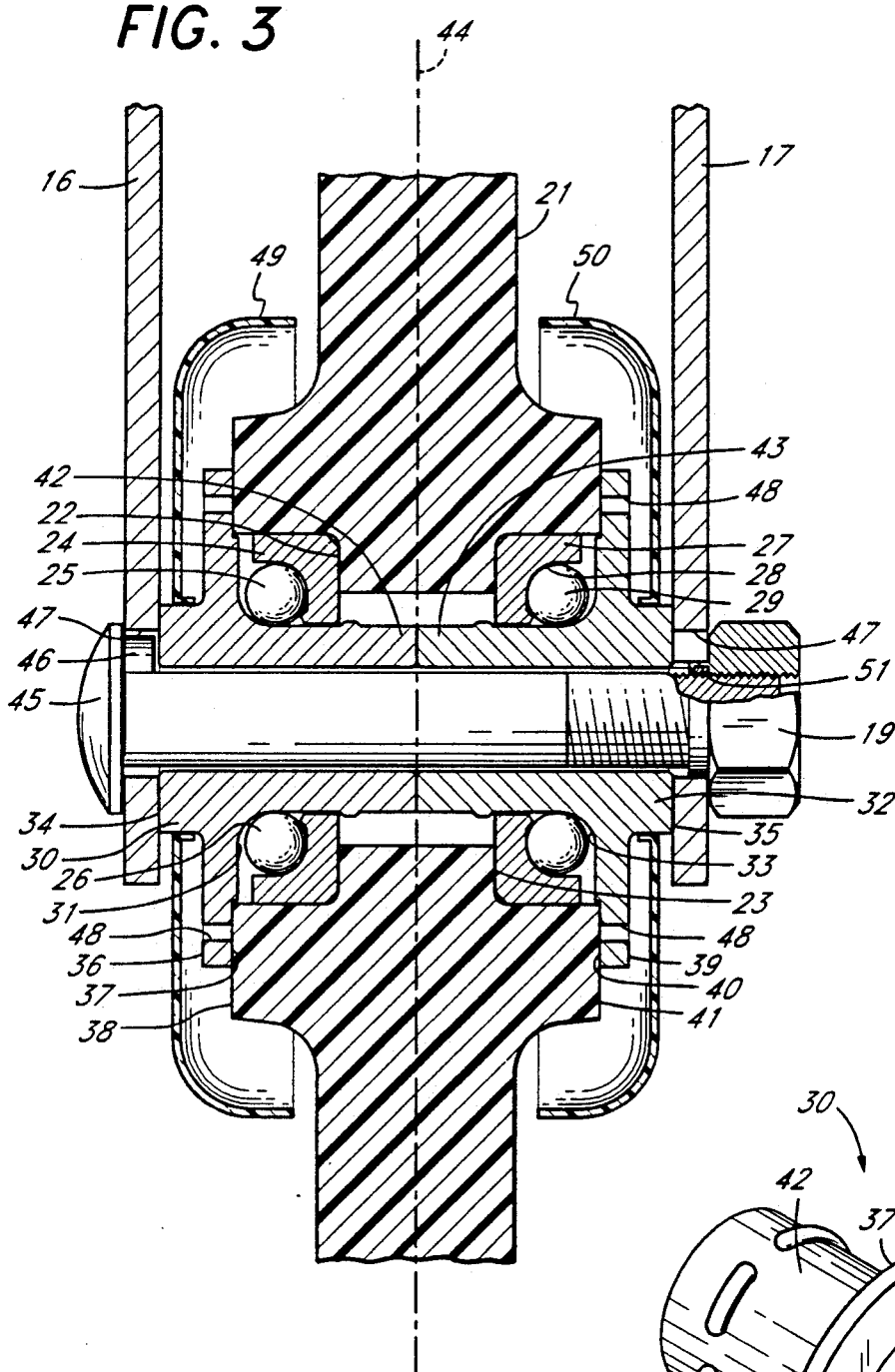
FIG. 3 is an enlarged cross-sectional view taken along line 3—3 of FIG. 2.

The shopping cart wheel 12 is shown in perspective view in FIG. 2 where it can be seen that a yoke 15 has a pair of arms 16 and 17 which support an axle 18 which is threaded to hold axle lock nut 19. Wheel 12 has a tire tread 20 supported on a hub 21 which is shown in cross-sectional view in FIG. 3.

Figure 4:
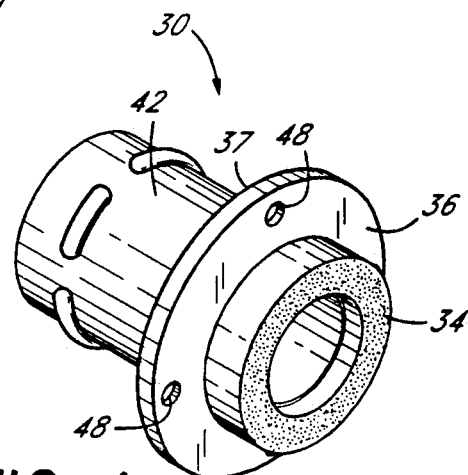
FIG. 4 is a perspective view of the outer bearing assembly of the wheel of FIG. 2.

Hub 21 is preferably molded from a polymer such as polypropylene and has a pair of bearing cavities comprising a first bearing cavity 22 and a second bearing cavity 23. Cavity 22 supports outer bearing 24 having an outer bearing race 25 along which a plurality of ballbearings 26 ride. Second bearing cavity 23 supports second outer bearing 27 having a race 28 along which ballbearings 29 ride. A first inner bearing 30 has an inner race 31 upon which ballbearings 26 ride. Second inner bearing 32 has a second inner race 33 upon which ballbearings 29 ride. First inner bearing 30 has a hub bearing surface 34 which is preferably roughened or textured as indicated in FIG. 4 to help prevent the inner bearing 30 from turning with respect to yoke arm 16. Similarly, second inner bearing 32 has a hub bearing surface 35 which likewise helps prevent the turning of the second inner bearing with respect to yoke arm 17.

Turning now to the friction mechanism of the present invention, a first friction disk 36 is integrally formed with first inner bearing 30. First friction disk 36 has a friction surface 37 which contacts a first hub friction surface 38 to provide a breaking action which, in turn, creates a certain amount of drag for the shopping cart 10. While it would be possible to have a friction disk on only one side, it is preferable to provide a second friction disk 39 with a second friction surface 40 which contacts a second hub friction surface 41.

While it is preferable that the friction disk be integral with the outer bearing, this need not be the case, and it can, as well, be a separate disk, although the preferred configuration is an integral friction disk and outer bearing member for ease in assembly and fabrication. The friction disks are preferably fabricated from a polyamide. It can also be seen in FIG. 3 that the first and second inner bearing assemblies have integral inner cylinders 42 and 43 which abut along a central bisecting plane 44.

As stated above, it is preferable that the amount of friction be adjustable since the amount of drag is, in part, dependent upon the amount of slope and expected wind at the particular market. In the construction shown in FIG. 3, the drag may be increased by tightening axle lock nut 19 thereby increasing the force exerted between nut 19 and the round axle head 45. It is also preferable that axle head 45 have a locking tab 46 which fits in a locking notch 47 shown in FIG. 2. Of course, the locking notch 47 is present on arm 16 as well as on arm 17 as shown. In this way the yoke may be used on either side of the cart and the nut placed on the inner surface to provide a smoother outer edge. Preferably, axle lock nut 19 is of the type which has a nylon insert 51 since such insert securely holds the nut in the preferred position. By the use of a torque wrench, the amount of torque used to tighten the nut can be accurately measured, and all four wheels can be given the same amount of drag. In some applications, only two wheels will be provided with such friction adjustments, but in this case it is highly advantageous to have the drag on both wheels equal so that the cart will be easy to push.

One of inner bearing assemblies 30 is shown in FIG. 4 where it can be seen that the hub bearing surface 34 is textured and that the first friction disk 36 has four holes 48. Such holes assist in letting any foreign matter which passes between the disk friction surface 37 and the hub friction surface 38 to escape.

A pair of thread guards 49 and 50 are supported on the first and second inner bearing assemblies and help prevent threads and other foreign matter from interfering with the action of the bearing.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A shopping cart wheel of the type having a hub with a pair of inner bearing races, a plurality of ball bearings, a pair of outer bearing races and an axle supported on a yoke said bearing races and ball bearings creating a first amount of friction against turning, wherein the improvement comprises:
   a hub friction surface on at least one of said hub; and
   at least one friction disk supported so that it does not rotate with respect to said yoke in normal use, said friction disk having a friction surface which contacts said hub friction surface as the wheel is turned with respect to the yoke, said friction disk being integral with at least one of said inner bearing races, whereby the turning of the wheel creates additional friction against turning over that caused by the bearing races and ball bearings.

2. The shopping cart wheel of claim 1 wherein there are first and second hub friction surfaces and first and second friction disks, said first friction disk having a first friction surface which contacts the first hub friction surface and a second friction disk having a second friction surface which contacts the second hub friction surface and each of said friction disks being integral with one of said pair of inner bearing races.

3. The shopping cart wheel of claim 1 wherein said wheel is held to said yoke by an axle bolt and lock nut and wherein when said axle bolt is tightened on said axle nut the friction between the friction surface of said friction disk and the hub friction surface increases.

4. The shopping cart wheel of claim 1 wherein said friction disk has a plurality of holes therethrough at said disk friction surface.

5. The shopping cart wheel of claim 1 wherein said hub is fabricated from polypropylene and said friction disk is fabricated from nylon.

6. A shopping cart wheel assembly of the type which is held between the first and second arms of a yoke and having an axle supported by said first and second arms of said yoke, said axle supporting first and second inner bearing members including first and second inner races and having a plurality of ball bearings held against said first and second inner races and a pair of outer bearings each having outer races, said outer bearings being supported by a hub having a tread on an outer periphery thereof and said hub being symmetrical about a central bisecting plane, wherein the improvement comprises:
   first and second friction disks held so they do not rotate with respect to said arms of said yoke as the hub turns in said yoke, said first and second friction disks having first and second friction surfaces and said first friction disk is integral with said first inner bearing and said second friction disk is integral with said second inner bearing; and
   first and second hub friction surfaces held by said hub so that the friction surfaces on said friction disks contact said hub friction surface and causes a drag against the turning of the hub in said yoke.

7. The shopping cart wheel of claim 6 wherein said axle is threaded on one end and has a lock nut thereon whereby when said lock nut is tightened, the friction disk is increasingly forced against the hub friction surface, and the amount of drag is adjustably increased and decreased.

8. The shopping cart wheel of claim 7 wherein said first and second inner bearings include a supporting cylinder which extends inwardly of said hub to said central bisecting plane.

9. The shopping cart wheel of claim 7 further including a pair of thread guards supported by said first and second inner bearing members.

10. The shopping cart wheel of claim 7 wherein said friction disks each have a plurality of axially directed openings therethrough.

11. The shopping cart wheel of claim 6 wherein said inner bearing members each have a yoke contacting surface which contacts said first and second arms of said yoke, and said yoke contacting surfaces have rotation prevention means for causing the inner bearing members to remain stationary with respect to the yoke arms when the wheel is turning.

12. The shopping cart wheel of claim 11 wherein said rotation prevention means comprises a textured surface on the yoke contacting surfaces.

* * * * *